United States Patent
Saitoh et al.

(10) Patent No.: US 7,350,983 B2
(45) Date of Patent: Apr. 1, 2008

(54) PHOTOELECTRIC COUPLING ASSEMBLY AND METHOD OF COUPLING OPTICAL FIBERS AND LIGHT RECEIVING/EMITTING ELEMENTS

(75) Inventors: Kazuhito Saitoh, Yokohama (JP); Wataru Sakurai, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/491,944

(22) Filed: Jul. 25, 2006

(65) Prior Publication Data

US 2007/0031092 A1 Feb. 8, 2007

(30) Foreign Application Priority Data

Aug. 3, 2005 (JP) ............... 2005-225096

(51) Int. Cl.
*G02B 6/42* (2006.01)
(52) U.S. Cl. .......................... 385/88; 385/89
(58) Field of Classification Search .................. None
See application file for complete search history.

(56) References Cited

U.S. PATENT DOCUMENTS

| | | | | |
|---|---|---|---|---|
| 3,948,582 A | * | 4/1976 | Martin | 385/56 |
| 4,268,113 A | * | 5/1981 | Noel, Jr. | 385/92 |
| 4,439,006 A | * | 3/1984 | Stevenson | 385/88 |
| 4,838,641 A | * | 6/1989 | Morimoto et al. | 385/87 |
| 5,177,806 A | * | 1/1993 | Abbott et al. | 385/76 |
| 5,574,814 A | * | 11/1996 | Noddings et al. | 385/90 |
| 6,364,541 B1 | * | 4/2002 | Nesnidal et al. | 385/92 |
| 6,517,259 B1 | | 2/2003 | Murata | |
| 6,915,049 B2 | | 7/2005 | Murata | |
| 2002/0159719 A1 | * | 10/2002 | Ide et al. | 385/90 |
| 2005/0013554 A1 | * | 1/2005 | Killer et al. | 385/88 |
| 2005/0063651 A1 | * | 3/2005 | Hamasaki et al. | 385/100 |
| 2005/0226569 A1 | * | 10/2005 | Sashinaka et al. | 385/92 |
| 2006/0072880 A1 | * | 4/2006 | Cheng | 385/88 |

FOREIGN PATENT DOCUMENTS

| | | |
|---|---|---|
| JP | 2005-115284 | 4/2005 |
| JP | 2006-059882 | 3/2006 |

* cited by examiner

*Primary Examiner*—Michelle Connelly-Cushwa
*Assistant Examiner*—Mike Stahl
(74) *Attorney, Agent, or Firm*—Global IP Counselors, LLP

(57) ABSTRACT

A photoelectric coupling assembly that is not affected by heat or adhesive leakage when mounted on a substrate, and a method of coupling an optical fiber and a light receiving/emitting element. The photoelectric coupling assembly includes (1) an optical fiber; (2) a plug having a through-hole into which the optical fiber is held in a manner where a distal end of the optical fiber protrudes from the plug; and (3) an optical head member including a photoelectric conversion unit having a light receiving/emitting element including a light receiving/emitting unit, and an aligning member having a guide hole to guide the distal end of the optical fiber to the light receiving/emitting unit when the plug and the optical head are detachably fitted into each other.

4 Claims, 6 Drawing Sheets

PRIOR ART

PHOTOELECTRIC COUPLING ASSEMBLY AND METHOD OF COUPLING OPTICAL FIBERS AND LIGHT RECEIVING/EMITTING ELEMENTS

BACKGROUND OF THE INVENTION

1. Field of the Invention

The present invention relates to a photoelectric coupling assembly used to couple an optical fiber and a light receiving/emitting element, and to a method of coupling an optical fiber and a light receiving/emitting element.

2. Description of the Related Art

Coupling assemblies are used for coupling an optical fiber to a light receiving/emitting element. FIG. 6 is a perspective view showing a conventional coupling assembly, which is disclosed in Japanese Laid-Open Patent Publication No. 2005-115284. This coupling assembly 100 has a ferrule 101, and the ferrule 101 has a plurality of fiber holes 102 for positioning and holding optical fibers. A plurality of electrical Wires 103 are formed by metal plating for each of the fiber holes 102 in the outer surface of the ferrule 101. The electrical wires 103 extend continuously from the bottom surface 101c of the ferrule 101 through the front surface 101a to the top surface 101d. The ferrule 101 is formed from a material containing a polyester resin, a PPS resin, or an epoxy resin.

When optical fibers are coupled with light receiving/emitting elements using the coupling assembly 100, the ferrule 101 in which the optical fibers are positioned and held is positioned and fixed in place on light receiving/emitting elements that are mounted on a substrate. Since solder or an adhesive is used for such fixation, heat for melting the solder, heat for curing the adhesive, leakage of the adhesive, and other such factors have had adverse effects on the light receiving/emitting elements.

SUMMARY OF THE INVENTION

An object of the present invention is to provide a photoelectric coupling assembly wherein a light receiving/emitting element is not affected by heat or by leakage of an adhesive when the assembly is mounted on a substrate, and also to provide a method of coupling an optical fiber and a light receiving/emitting element.

In order to achieve these objects, a photoelectric coupling assembly is provided that includes (1) an optical fiber; (2) a plug having a through-hole into which the optical fiber is held in a manner where a distal end of the optical fiber protrudes from the plug; and (3) an optical head member including a photoelectric conversion unit having a light receiving/emitting element including a light receiving/emitting unit, and an aligning member having a guide hole to guide the distal end of the optical fiber to the light receiving/emitting unit when the plug and the optical head are detachably fitted into each other.

In another aspect of the present invention, a method is provided for coupling an optical fiber and a light receiving/emitting element, wherein (1) the optical fiber is mounted in a plug in which the distal end of the optical fiber can be inserted so as to protrude from the distal end surface; (2) an optical head member, which integrally includes a photoelectric conversion unit having a light receiving/emitting element and an aligning member that can be fitted to the plug, is mounted on a substrate; and (3) the plug is fitted into the aligning member of the optical head member mounted on the substrate.

These and other features, aspects, and advantages of the present invention will be better understood through the following description, appended claims, and accompanying drawings. In the explanation of the drawings, an identical mark is applied to identical elements and an overlapping explanation will be omitted.

BRIEF DESCRIPTION OF THE DRAWINGS

Referring now to the attached drawings which form a part of this original disclosure.

DETAILED DESCRIPTION OF THE INVENTION

Figure 1A:
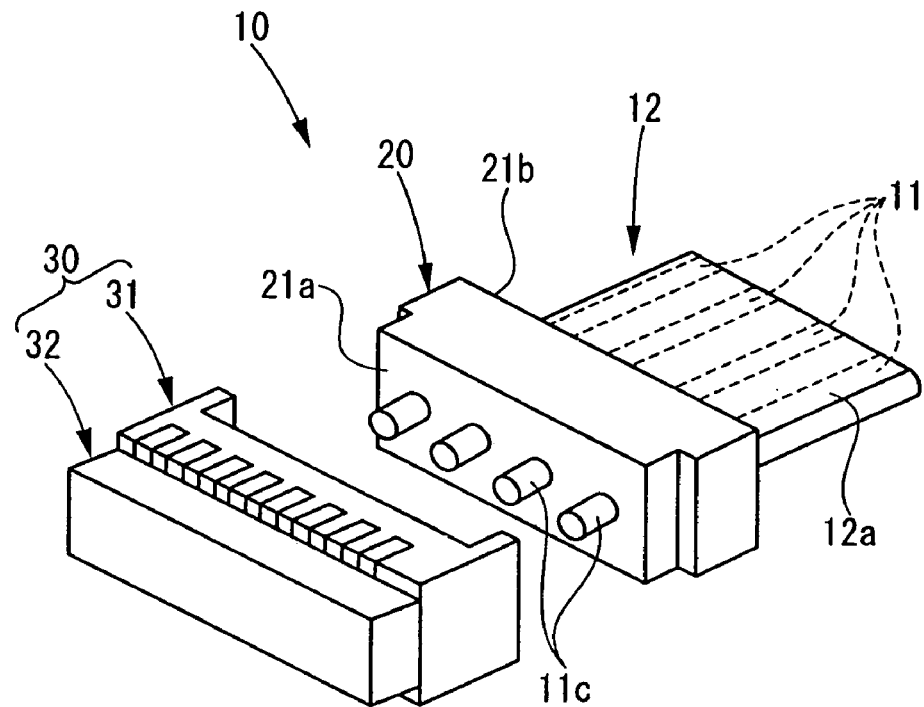
FIG. 1A is an exploded perspective view of a photoelectric coupling assembly according to an embodiment of the present invention.
Figure 1B:
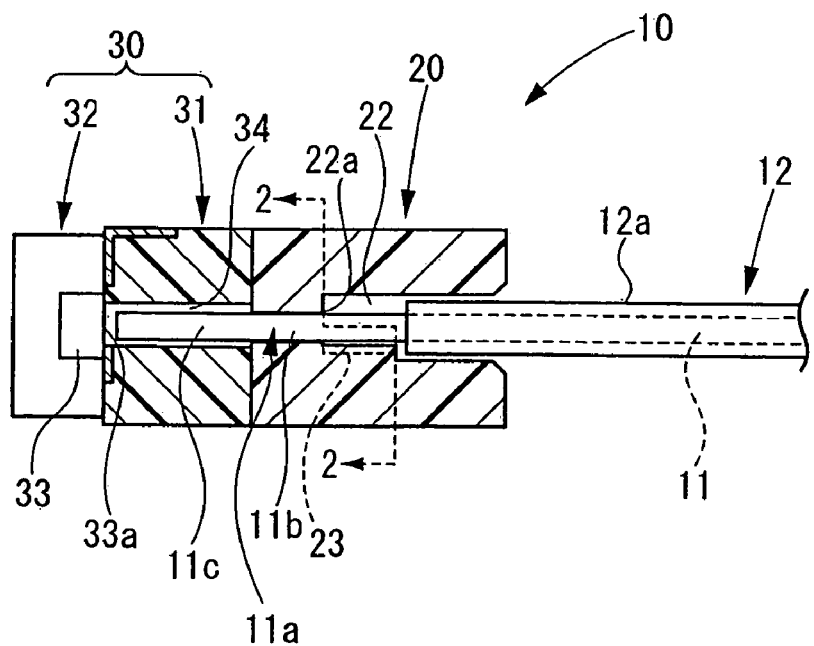
FIG. 1B is a cross-sectional view of the photoelectric coupling assembly according to the embodiment of the present invention.

FIG. 1A is an exploded perspective view showing an embodiment of a photoelectric coupling assembly of the present invention, and FIG. 1B is a cross-sectional view of the same. This photoelectric coupling assembly 10 is used to couple optical fibers 11 with light receiving/emitting elements 33, and includes a plug 20 and an optical head member 30 that can be fitted into each other. The plug 20 is provided with through-holes 22 that correspond to the guide holes 34 in the optical head member 30 and that allow the optical fibers 11 to pass through, and the distal ends 11a to protrude. The through-holes 22 are provided with guiding holes 22a for positioning the distal ends 11a of the optical fibers 11 and allowing them to be inserted to the guide holes 34. The optical fibers are held in the plug 20 such that the distal ends 11a of the optical fibers 11 are passed through guiding holes 22a and protruding portions 11c of the optical fibers 11 extend from a distal end surface 21a of the plug 20. The plug 20 and the optical fibers 11 together constitute an optical fiber assembly of the present invention.

The optical head member 30 integrally has an aligning member 31 for aligning the distal ends 11a of the optical fibers 11 in specified positions, and a photoelectric conversion unit 32 that has light receiving/emitting elements 33. The aligning member 31 includes a plurality of guide holes 34 for positioning the distal ends 11a of the optical fibers 11 and guiding them to light receiving/emitting units 33a of the light receiving/emitting elements 33 when the plug 20 and the optical head member 30 are fitted together. The length of the protruding portions 11c (about 2 mm, for example) is set in advance so that the end surfaces of the optical fibers are in the vicinity of the light receiving/emitting units 33a of the light receiving/emitting elements 33 after the plug 20 and the optical head member 30 are fitted together. Also, when the plug 20 and the optical head member 30 are fitted together, the plug 20 is interlocked with the aligning member 31 of the optical head member 30 by pawls or the like (not shown), which prevents the plug 20 from separating from the aligning member 31.

A plurality (four in this embodiment) of optical fibers 11 are aligned and collectively covered by a coating 12a to form a fiber ribbon 12. It is preferable that the optical fibers 11 be multimode optical fibers. For example, optical fibers having a core diameter of approximately 50 μm, a clad diameter of approximately 80 μm, and a protective coating outer diameter of approximately 125 μm can be used. Using multimode optical fibers makes it possible to allow slight misalignment in the axial direction or in a direction perpendicular to the axial direction of the optical fibers 11.

Figure 2:
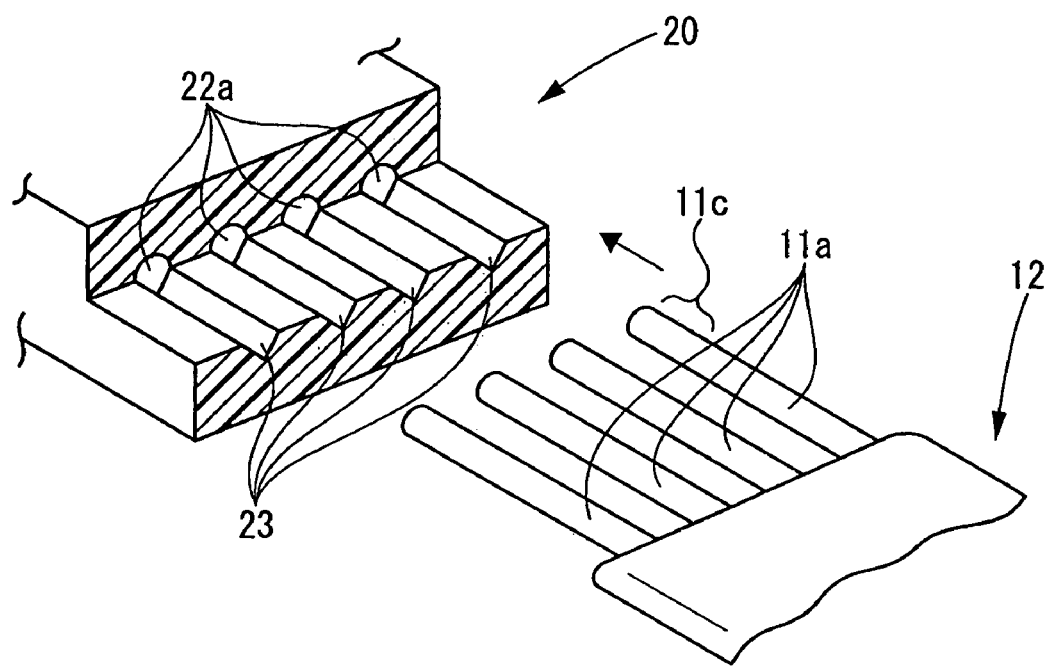
FIG. 2 is a perspective view showing how the distal ends of optical fibers are inserted into a plug in the photoelectric coupling assembly according to the embodiment of the present invention in which part of the plug is cut off from the cutting surface 2-2 for illustrating internal structure thereof.

FIG. 2 is a perspective view showing how the distal ends 11a of the optical fibers 11 are inserted into the plug 20 in the photoelectric coupling assembly according to the embodiment of the present invention in which part of the plug 20 is cut off from the cutting surface 2-2 for illustrating internal structure thereof. The sides of the guiding holes 22a into which the optical fibers 11 are inserted can be further provided with V-shaped grooves 23 for positioning the optical fibers 11. In this case, the distal ends 11a of the optical fibers 11 are inserted along the V-shaped grooves 23 and into the guiding holes 22a of the plug 20, whereby the distal ends 11a can easily be inserted to specified positions in the through-holes 22.

The optical fibers 11 are held in the through-holes 22 at a pitch of approximately 250 μm, for example. The optical fibers 11 are fixed in the plug 20 with, for example, a thermosetting adhesive that is filled into the through-holes 22 containing the guiding holes 22a.

Figure 3A:
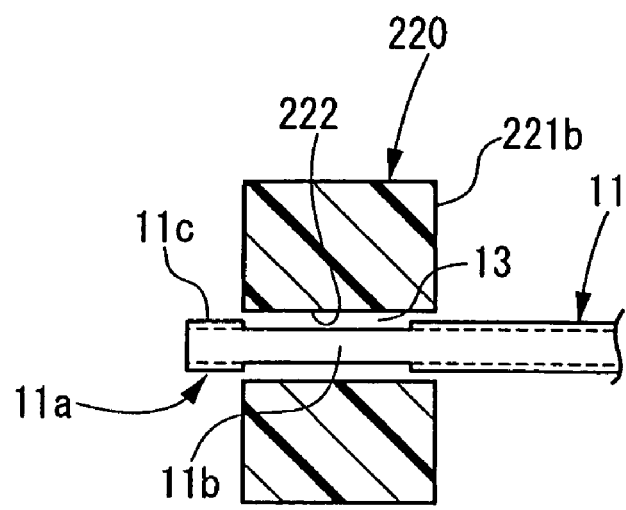
FIG. 3A is a cross-sectional view showing how optical fibers are mounted in a plug in a photoelectric coupling assembly according to a modified embodiment of the present invention when the optical fibers are single optical fibers.
Figure 3B:
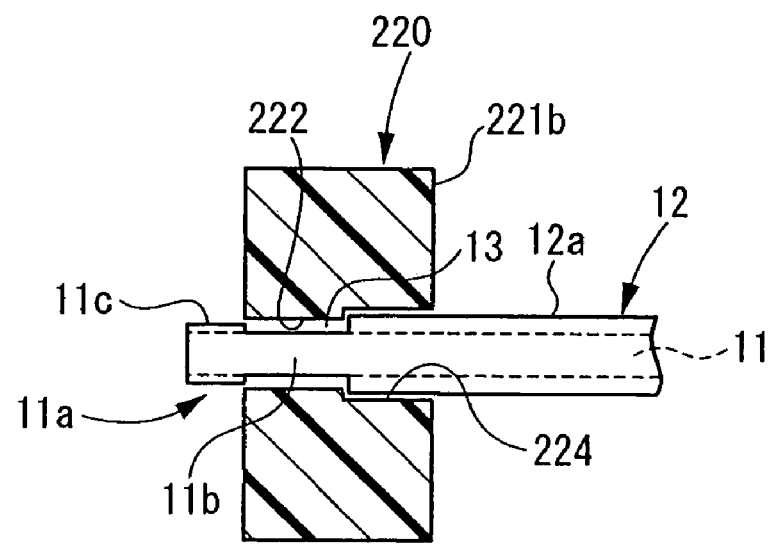
FIG. 3B is a cross sectional view showing how optical fibers are mounted in the plug in the photoelectric coupling assembly according to a modified embodiment of the present invention when the optical fibers are formed as a fiber ribbon.

FIGS. 3A and 3B are cross-sectional views showing how the optical fibers 11 are mounted in a plug 220 in the photoelectric coupling assembly according to modified embodiments of the present invention, wherein FIG. 3A shows a case in which the optical fibers 11 are single optical fibers, and FIG. 3B shows a case in which the optical fibers 11 are formed as a fiber ribbon 12. In the modified embodiment shown in FIG. 3B, a retracted part 224 is provided in a side of the back end surface 221b of the plug 220 to allow the fiber ribbon 12 to be engaged therein. In either of the modified embodiments shown in FIGS. 3A and 3B, the distal ends 11a of the optical fibers 11 are inserted into through-holes 222 of the plug 220 while the protective coating is still on. Therefore, there is no need for a procedure of removing the protective coating, making the operation easier and faster to perform. When the plug 220 is handled, the protruding portions 11c of the optical fibers 11 can be protected so as not to be damaged.

Moreover, as in the modified embodiments illustrated in FIGS. 3A and 3B, the distal ends 11a of the optical fibers 11 may be provided with bare fiber portions 11b where the protective coating has been removed inside the through-holes 22. In this case, the optical fibers 11 are bonded to the plug 220 by an adhesive 13 at the bare fiber portions 11b. The optical fibers 11 can be more precisely positioned and more firmly fixed in the through-holes in comparison to bond the fibers to the plug via the protective coating.

Figure 4A:
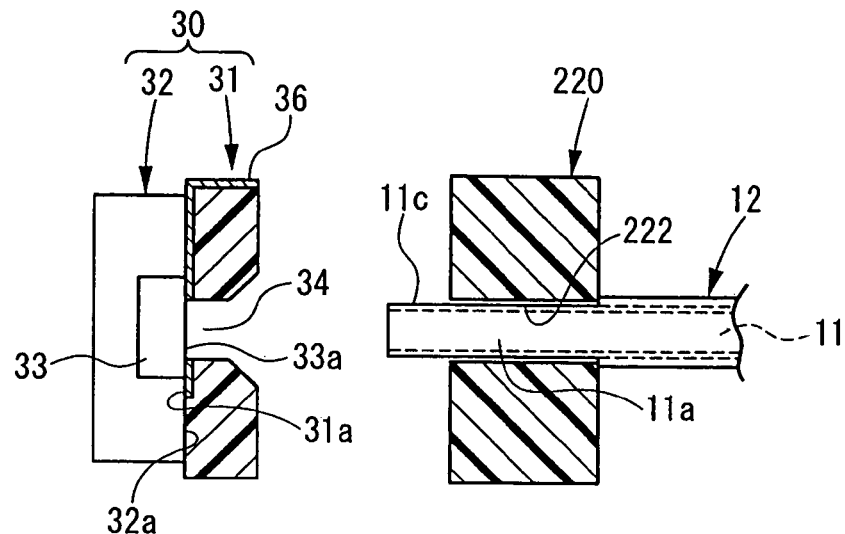
FIG. 4A is a cross-sectional view of a photoelectric coupling assembly according to a modified embodiment of the present invention in a state before a plug and an optical head member are connected.
Figure 4B:
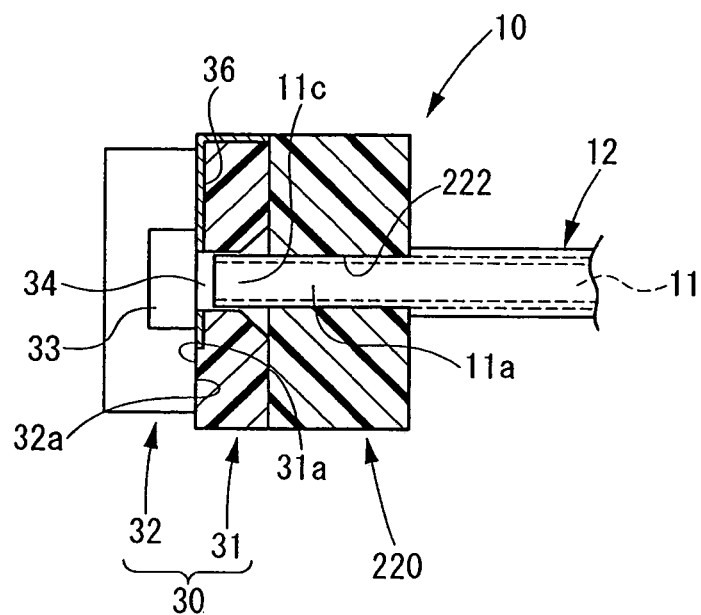
FIG. 4B is a cross sectional view of the photoelectric coupling assembly according to the modified embodiment of the present invention in a state after the plug and the optical head member are connected.

FIGS. 4A and 4B are cross-sectional views showing another modified embodiment of a photoelectric coupling assembly according to the present invention, wherein FIG. 4A shows a state before the plug 220 and the optical head member 30 are fitted into each other, and FIG. 4B shows a state after the plug 220 and the optical head member 30 are fitted into each other. The distal ends 11a of the optical fibers 11 are inserted into the through-holes 222 of the plug 220 while the protective coating is still on, and the protruding portions 11c are inserted into the guide holes 34 in the aligning member 31. In this case, when the protruding portions 11c of the optical fibers 11 are inserted into the guide hole's 34 in the optical head member 30, the edges of the guide holes 34 can be prevented from coming into contact with and damaging the optical fibers 11.

A plurality of light receiving/emitting elements 33 (four, for example) are disposed in an arrayed configuration in accordance with the pitch of the guide holes 34 in the photoelectric conversion unit 32 of the optical head member 30. Examples of the light receiving/emitting elements 33 include surface-emitting lasers (VCSEL) as a light source, and photo detectors (PD) as light receiving units. The photoelectric conversion unit 32 provided with light receiving/emitting elements 33 is bonded in advance to the aligning member 31. The light emitting surfaces of the light sources or the light-receiving surfaces of the light receiving units are adjusted to be positioned as light receiving/emitting units 33a at the exits of the guide holes 34. The alignment pitch is approximately 250 μm, for example.

Figure 4C:
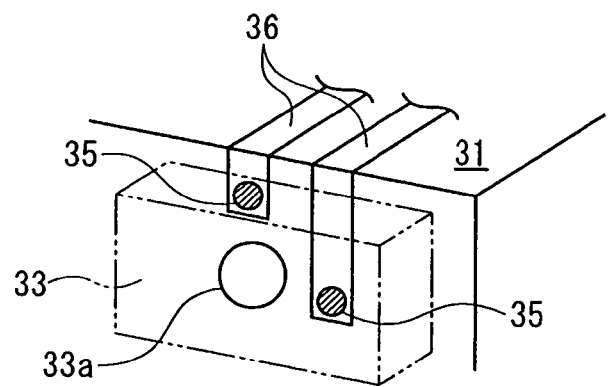
FIG. 4C is an enlarged partial perspective view of a main section of the optical head member according to the embodiment of the present invention.
Figure 5A:
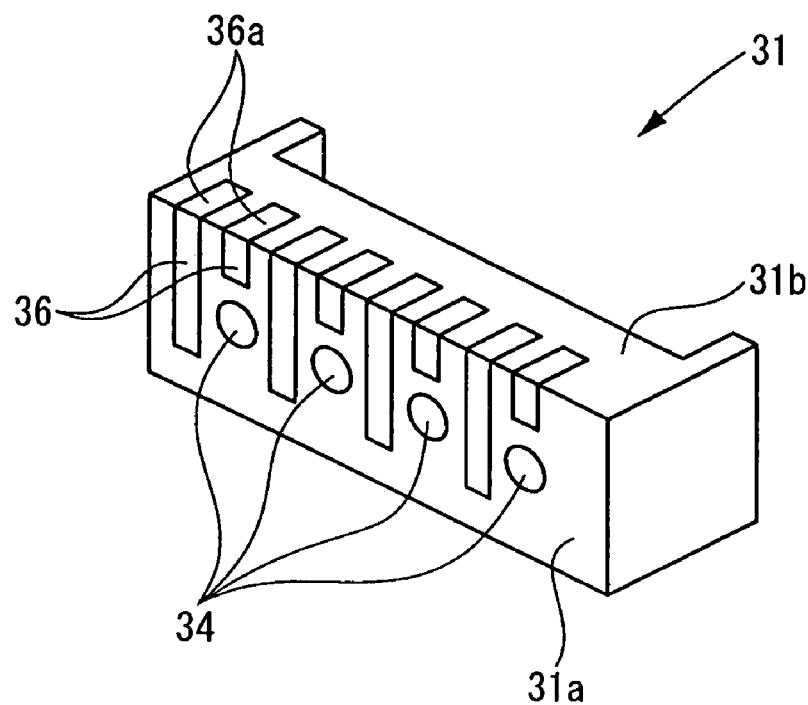
FIG. 5A is a perspective view of an alignment member of the photoelectric coupling assembly according to the embodiment of the present invention as seen from the light receiving/emitting element side.
Figure 5B:
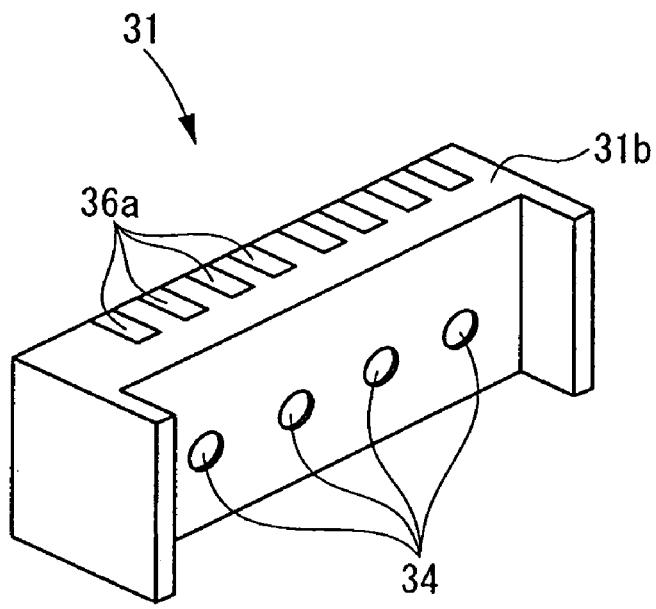
FIG. 5B is a perspective view of an alignment member of the photoelectric coupling assembly according to the embodiment of the present invention as seen from the optical fiber side.
Figure 6:
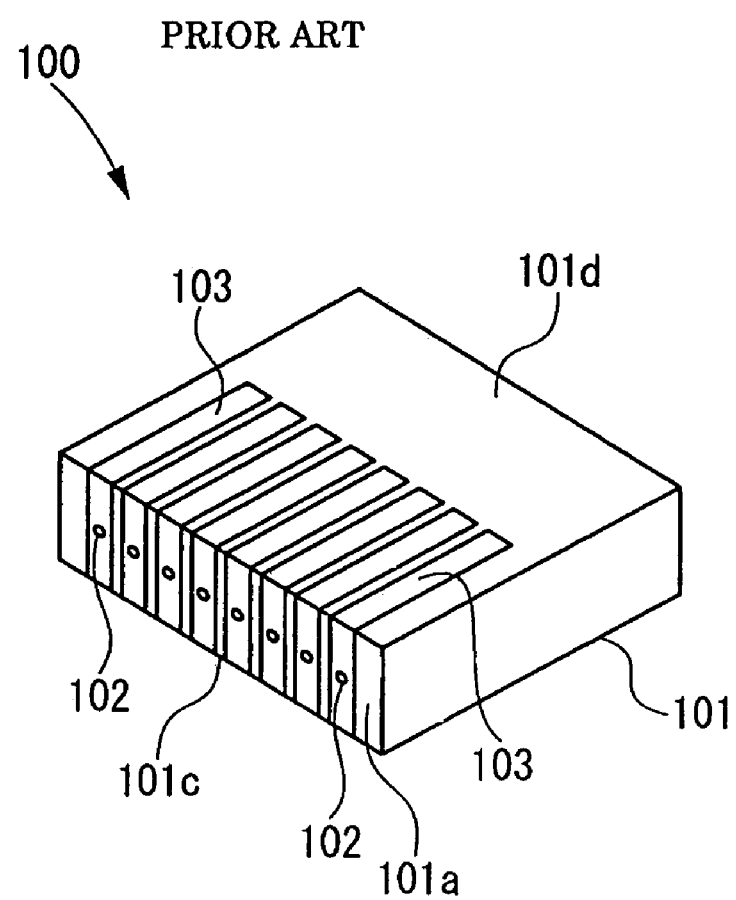
FIG. 6 is a perspective view of a conventional coupling assembly.

FIG. 4C is an enlarged partial perspective view of a main section of the optical head member 30. FIGS. 5A and 5B are perspective views showing the alignment member in the photoelectric coupling assembly of the present embodiment, wherein FIG. 5A is a view as seen from the light receiving/emitting element side, and FIG. 6B is a view as seen from the optical fiber side. In order to supply electricity and transmit signals to the photoelectric conversion unit 32, bump contacts 35, which serve as terminals of the element-side, are formed on the element-side contacting surface (first contacting surface) 32a, facing the aligning member 31, of the photoelectric conversion unit 32. Electrical wiring units 36 for establishing conduction to the terminals of the element-side are formed on the alignment-side contacting surface (second contacting surface) 31a, facing the element-side contacting surface 32a, of the aligning member 31. The electrical wiring units 36 reach from the alignment-side contacting surface 31a to the outer side surface 31b (the top and/or bottom surface) of the aligning member 31, where electrical wiring unit terminals 36a are formed.

When the aligning member 31 and the photoelectric conversion unit 32 are connected, conduction is established between the bump contacts 35 and the electrical wiring units 36, and the electrical wiring unit terminals 36a are exposed in the top and/or bottom surface. Consequently, by mounting the optical head member 30 on the substrate so that the electrical wiring unit terminals 36a are in contact with the electrical circuits on the substrate, electricity can easily be supplied to the light emitting elements 33, and signals can easily be received from the light receiving elements.

Next, a method of coupling an optical fiber and a light receiving/emitting element of the present invention will be described. First, an optical fiber 11 is mounted in a plug 20 so that a protruding portion 11c of the optical fiber 11 protrudes from a distal end surface 21a of the plug 20 by inserting the distal ends 11a of the optical fibers 11 into the plug 20. An optical head member 30, which integrally includes a photoelectric conversion unit 32 having a light receiving/emitting element 33 and an aligning member 31 that can be fitted onto the plug 20, is mounted on a substrate (not shown). The plug 20 is fitted into and fixed to the aligning member 31 of the optical head member 30 mounted on the substrate, whereby the optical fibers 11 and light receiving/emitting elements 33 are coupled. The plug 20 can be removed from the optical head member 30 if the interlocked pawls or the like are released.

According to the photoelectric coupling assembly and the method of coupling an optical fiber and a light receiving/emitting element described above, the optical head member 30 is not affected by heat from soldering or by leaking adhesives during the mounting of the optical fibers 11 to the plug 20, because the optical fiber 11 and the light receiving/emitting element 33 are coupled by fitting the plug 20 on which the optical fiber 11 is mounted into the optical head member 30 that is mounted on the substrate and equipped with the photoelectric conversion unit 32. Also, since the aligning member 31 of the optical head member 30 is provided with the guide holes 34 for positioning and guiding the distal ends 11a of the optical fibers 11 to the light receiving/emitting units 33a of the photoelectric conversion unit 32, the optical fiber 11 can be easily positioned by inserting the distal ends 11a of the optical fiber 11 into the guide holes 34.

A photoelectric coupling assembly and a method of coupling a photoelectric coupling assembly of the present invention are not limited to the embodiments described above, and suitable modifications and improvements can be made. For example, in the embodiments described above, examples were given in which four optical fibers 11 were coupled with four light receiving/emitting elements 33, but the number of optical fibers 11 and the number of light receiving/emitting elements 33 are not limited thereto. In addition, in the embodiments described above, cases were described in which the optical fibers 11 were formed as the fiber ribbon 12, but the optical fibers 11 are not limited thereto.

While this invention has been described in connection with what are presently considered to be the most practical and preferred embodiments, the invention is not limited to the disclosed embodiments, but on the contrary, is intended to cover various modifications and equivalent arrangements included within the spirit and scope of the appended claims.

The entire disclosure of Japanese Patent Application No. 2005-225096 filed on. Aug. 3, 2005 including specification, claims, drawings, and summary is incorporated herein by reference in its entirety.

What is claimed is:

1. A photoelectric coupling assembly comprising:
   (1) an optical fiber;
   (2) a plug having a through-hole in which the optical fiber is held in a manner where a distal end of the optical fiber protrudes from the plug; and
   (3) an optical head member including a photoelectric conversion unit having a light receiving/emitting element including a light receiving/emitting unit, and an aligning member having a guide hole to guide the distal end of the optical fiber to the light receiving/emitting unit when the plug and the optical head are detachably fitted into each other, wherein the photoelectric conversion unit further includes an element electrode of the light receiving/emitting element on a first contacting surface thereof that faces the aligning member, and the aligning member further includes an electrical wiring unit configured and arranged to establish conduction with the element electrode of the photoelectric conversion unit on an outer side surface and a second contacting surface thereof that faces the first contacting surface of the photoelectric conversion unit.

2. A photoelectric coupling assembly according to claim 1, wherein
   the optical fiber is multimode optical fiber; and
   the distal end of the optical fiber is inserted into the guide hole with protective coating being still on the optical fiber.

3. A photoelectric coupling assembly according to claim 2, wherein
   the optical fiber includes bare fiber portion where the protective coating of the optical fiber has been removed and the optical fiber is bonded with the plug inside the through-hole at the bare fiber portion.

4. A method of coupling an optical fiber and a light receiving/emitting element, comprising:
   mounting the optical fiber in a plug in which a distal end of the optical fiber can be inserted so as to protrude from a distal end surface of the plug;
   mounting an optical head member, which includes a photoelectric conversion unit having a light receiving/emitting element and an aligning member configured and arranged to be fitted onto the plug, on a substrate; and
   fitting the plug into the aligning member of the optical head member mounted on the substrate, wherein the photoelectric conversion unit further includes an element electrode of the light receiving/emitting element on a first contacting surface thereof that faces the aligning member, and the aligning member further includes an electrical wiring unit configured and arranged to establish conduction with the element electrode of the photoelectric conversion unit on an outer side surface and a second contacting surface thereof that faces the first contacting surface of the photoelectric conversion unit.

* * * * *